US010038627B2

(12) United States Patent
Pukhraj Jain et al.

(10) Patent No.: US 10,038,627 B2
(45) Date of Patent: Jul. 31, 2018

(54) SELECTIVE RULE MANAGEMENT BASED ON TRAFFIC VISIBILITY IN A TUNNEL

(71) Applicant: BROCADE COMMUNICATIONS SYSTEMS, INC., San Jose, CA (US)

(72) Inventors: Rajesh Pukhraj Jain, San Ramon, CA (US); Eswara S. P. Chinthalapati, San Jose, CA (US); Sandeep G. Bhat, Sunnyvale, CA (US)

(73) Assignee: BROCADE COMMUNICATIONS SYSTEMS LLC, San Jose, CA (US)

( * ) Notice: Subject to any disclaimer, the term of this patent is extended or adjusted under 35 U.S.C. 154(b) by 21 days.

(21) Appl. No.: 15/481,319

(22) Filed: Apr. 6, 2017

(65) Prior Publication Data

US 2017/0346731 A1 Nov. 30, 2017

Related U.S. Application Data

(60) Provisional application No. 62/343,539, filed on May 31, 2016, provisional application No. 62/343,550, filed on May 31, 2016.

(51) Int. Cl.
*H04J 3/16* (2006.01)
*H04L 12/721* (2013.01)
(Continued)

(52) U.S. Cl.
CPC .......... *H04L 45/38* (2013.01); *H04L 12/4633* (2013.01); *H04L 12/4641* (2013.01); *H04L 45/745* (2013.01); *H04L 49/25* (2013.01)

(58) Field of Classification Search
CPC . H04L 12/46; H04L 12/4633; H04L 12/4641; H04L 12/721; H04L 12/741;
(Continued)

(56) References Cited

U.S. PATENT DOCUMENTS 9,083,605 B2 * 7/2015 Banavalikar ............ H04L 45/00
9,300,580 B2 * 3/2016 DeCusatis ........... H04L 12/4641
(Continued)

OTHER PUBLICATIONS

Liu, Software Defined Networking and Tunneling for Mobile Networks, Master of Science Thesis, KTH Royal Institute of Technology, 85 pages, Feb. 2012.*

*Primary Examiner* — Frank Duong
(74) *Attorney, Agent, or Firm* — Shun Yao; Park, Vaughan, Fleming & Dowler LLP

(57) ABSTRACT

One embodiment of the present invention provides a switch. The switch includes a storage device, a rule management module, an inner packet module, and a packet processor. During operation, the rule management module obtains a rule associated with a data flow within tunnel encapsulation of a tunnel. This rule indicates how the flow is to be processed at the switch. The rule management module then applies an initial rule to a respective line card of the switch. The initial rule is derived from a virtual network identifier, which is associated with the tunnel, of the obtained rule. The inner packet module determines that a first inner packet, which is encapsulated with a first encapsulation header, belongs to the flow without decapsulating the first encapsulation header. The rule management module applies the obtained rule to a line card associated with an ingress port of the encapsulated first inner packet.

20 Claims, 9 Drawing Sheets

(51) Int. Cl.
*H04L 12/741* (2013.01)
*H04L 12/947* (2013.01)
*H04L 12/46* (2006.01)

(58) Field of Classification Search
CPC ....... H04L 12/947; H04L 29/06; H04L 45/38; H04L 45/745; H04L 49/25; H04L 69/22
See application file for complete search history.

(56) References Cited

U.S. PATENT DOCUMENTS

| | | |
|---|---|---|
| 9,350,657 B2* | 5/2016 | Gross, IV ............... H04L 45/74 |
| 2003/0081607 A1 | 5/2003 | Kavanagh |
| 2008/0031141 A1 | 2/2008 | Lean |
| 2010/0085978 A1 | 4/2010 | Ramankutty |
| 2011/0004932 A1 | 1/2011 | Spatscheck |
| 2011/0134920 A1 | 6/2011 | Dyke |
| 2013/0124707 A1 | 5/2013 | Ananthapadmanabha |
| 2014/0050223 A1 | 2/2014 | Foo |
| 2014/0317269 A1 | 10/2014 | Munoz De La Torre Alonso |
| 2015/0289162 A1 | 10/2015 | Frydman |

\* cited by examiner

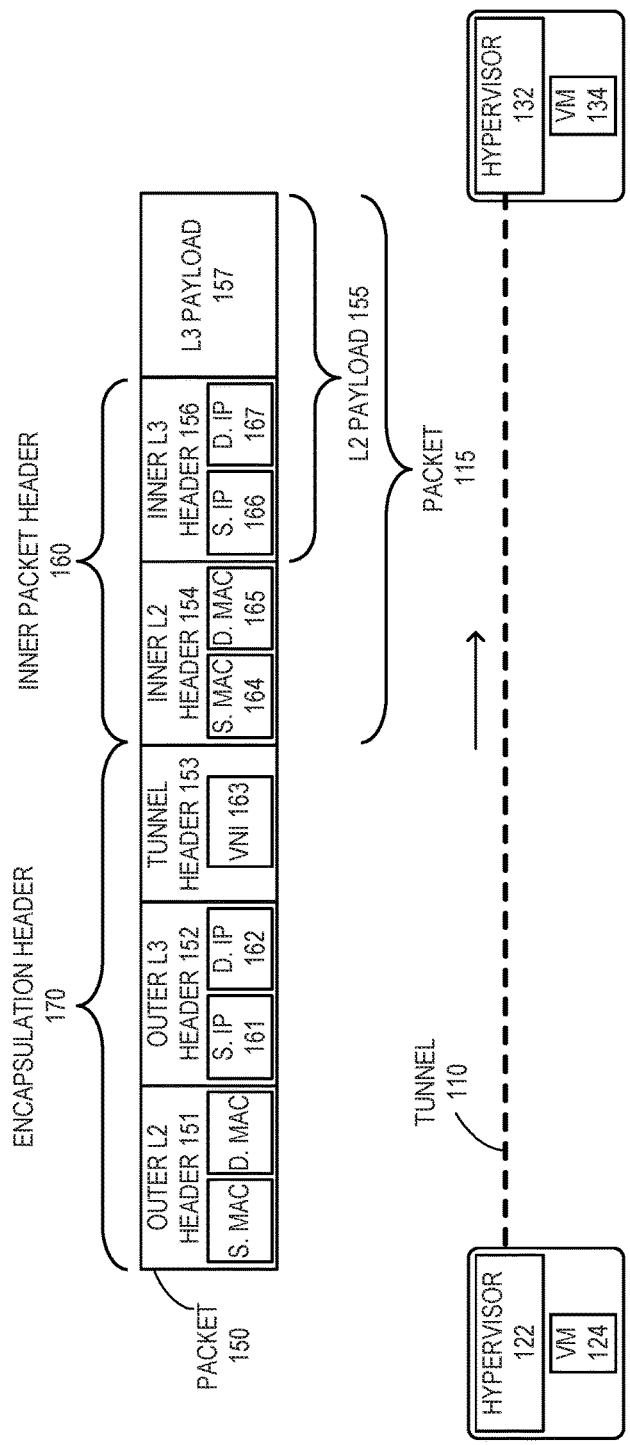

SELECTIVE RULE MANAGEMENT BASED ON TRAFFIC VISIBILITY IN A TUNNEL

RELATED APPLICATION

This application claims the benefit of U.S. Provisional Application No. 62/343,539, titled "Method and System for Facilitating Traffic Monitoring an Overlay Transit Network," by inventors Sandeep G. Bhat, Eswara S. P. Chinthalapati, and Rajesh Pukhraj Jain, filed 31 May 2016; and U.S. Provisional Application No. 62/343,550, titled "Method and System for Facilitating Visibility to Network Traffic in an Overlay Transit Network," by inventors Sandeep G. Bhat, Eswara S. P. Chinthalapati, and Rajesh Pukhraj Jain, filed 31 May 2016, the disclosures of which are incorporated by reference herein.

The present disclosure is related to U.S. Pat. No. 8,867,552, application Ser. No. 13/087,239, titled "Virtual Cluster Switching," by inventors Suresh Vobbilisetty and Dilip Chatwani, issued 21 Oct. 2014, filed 14 Apr. 2011, the disclosure of which is incorporated by reference herein.

BACKGROUND

Field

The present disclosure relates to communication networks. More specifically, the present disclosure relates to a system and a method for facilitating rule management to network switches based on traffic visibility in a tunnel.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as efficient forwarding of tunnel traffic (e.g., a packet encapsulated with an encapsulation header associated with a tunnel). However, the capabilities of a switch cannot grow infinitely. It is limited by physical space, power consumption, and design complexity, to name a few factors. Furthermore, switches with higher capability are usually more complex and expensive. As a result, enhancing the capabilities of a switch adds significant value proposition.

Typically, to expand a lower layer network across a higher layer network (e.g., an Ethernet network over an Internet Protocol (IP) network), a tunnel is established between two tunnel endpoints. If a device in a segment of a lower layer network cannot establish a tunnel, a tunnel gateway is used. A tunnel gateway can originate or terminate tunnels for the devices in that network segment. The tunnel gateway can be a distributed (or virtual) tunnel endpoint, which can be associated with a plurality of switches operating as a single, logical tunnel endpoint. A tunnel endpoint for a tunnel can originate or terminate tunnel forwarding for the tunnel.

While a distributed tunnel endpoint brings many desirable features in forwarding traffic via tunnels, some issues remain unsolved in facilitating visibility in a tunnel and utilizing the visibility.

SUMMARY

One embodiment of the present invention provides a switch. The switch includes a storage device, a rule management module, an inner packet module, and a packet processor. During operation, the rule management module obtains a rule associated with a data flow within tunnel encapsulation of a tunnel. This rule indicates how the flow is to be processed at the switch. The rule management module then applies an initial rule to a respective line card of the switch. The initial rule is derived from a virtual network identifier, which is associated with the tunnel, of the obtained rule. The inner packet module determines that a first inner packet, which is encapsulated with a first encapsulation header, belongs to the flow without decapsulating the first encapsulation header. In response, the rule management module applies the obtained rule to a line card associated with an ingress port of the encapsulated first inner packet.

In a variation on this embodiment, the rule management module determines a previous hop for the encapsulated first inner packet from a local routing table and identifies a port associated with the previous hop as the ingress port from a local forwarding table.

In a variation on this embodiment, the rule management module selects the first inner packet in response to matching the virtual network identifier.

In a variation on this embodiment, the tunnel is a virtual extensible local area network (VXLAN) tunnel and the virtual network identifier is a VXLAN network identifier (VNI).

In a variation on this embodiment, the switch is a member of a network of interconnected switches, which is identified based on a fabric identifier, wherein the network of interconnected switches operates as a tunnel endpoint for the tunnel.

In a variation on this embodiment, obtaining the rule includes inspecting an inner header of a second inner packet encapsulated with a second encapsulation header without decapsulating the second encapsulation header and providing information associated with the inner header to a management entity capable of generating the rule. The encapsulation header is associated with the tunnel and the second inner packet belongs to the flow.

In a further variation, the rule management module selects the second inner packet for inspecting the inner header by sampling packets of the flow.

In a further variation, the rule management module incorporates information associated with the second inner packet in a tunnel information table.

In a further variation, the management entity is one of: a management application, an application virtual machine, and a controller of a software defined network (SDN).

In a variation on this embodiment, the rule is one of: (i) an access control list (ACL) applicable to a port of the switch; and (ii) a flow definition specifying how a flow is to be processed in the SDN, wherein the flow definition is provided by a controller of the SDN.

BRIEF DESCRIPTION OF THE FIGURES

FIG. 1B illustrates an exemplary traffic visibility in a tunnel-encapsulated packet, in accordance with an embodiment of the present invention.

FIG. 1C illustrates an exemplary tunnel information table facilitating utilization of traffic visibility in a tunnel, in accordance with an embodiment of the present invention.

In the figures, like reference numerals refer to the same figure elements.

DETAILED DESCRIPTION

Figure 1A:
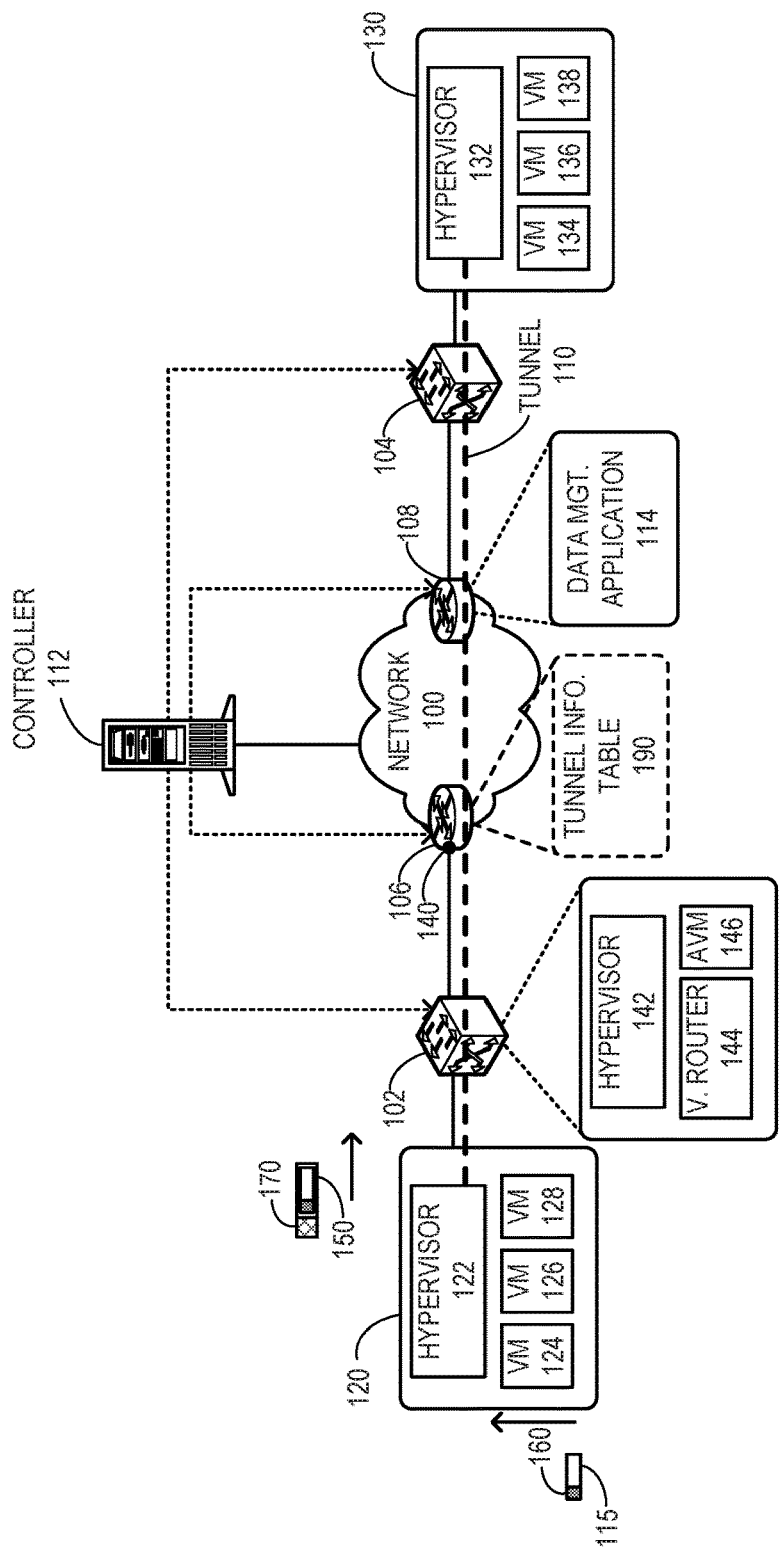
FIG. 1A illustrates an exemplary utilization of traffic visibility in a tunnel, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently managing traffic in a tunnel is solved by (i) obtaining information of a traffic flow based on visibility in a tunnel; and (ii) managing rules to process the traffic flow. Typically, a tunnel is established between two tunnel endpoints. A tunnel endpoint can be a switch (or any computing device) capable of originating or terminating a tunnel encapsulation header. To forward a packet via the tunnel, the tunnel endpoint encapsulates the packet with an encapsulation header associated with a corresponding tunneling protocol (e.g., a layer-3 encapsulation header over a layer-2 header). The source and destination addresses in the encapsulation header correspond to the tunnel endpoints of the tunnel.

Examples of a tunneling protocol include, but are not limited to, virtual extensible LAN (VXLAN), generic routing encapsulation (GRE), network virtualization using GRE (NVGRE), layer-2 tunneling protocol (L2TP), and multi-protocol label switching (MPLS). Different virtual local area networks (VLANs) are mapped to different corresponding virtual network identifiers for a tunnel. A tunnel endpoint can include the virtual network identifier in the encapsulation header associated with the tunnel. For example, if the tunneling protocol is VXLAN, the tunnel endpoint can be a virtual tunnel endpoint (VTEP), which maps a VXLAN network identifier (VNI) to a corresponding VLAN. In some embodiments, the tunnel endpoint is in a distributed tunnel endpoint, which includes a plurality of tunnel endpoints operating based on virtual router redundancy protocol (VRRP).

With existing technologies, a switch does not process a packet beyond the outermost header. If the destination address of a header matches the address of the switch, that header is removed and rest of the packet is promoted to an upper layer. When a tunnel endpoint encapsulates a packet, which is the inner packet, with an encapsulation header, intermediate switches forward the encapsulated outer packet based on the encapsulation header. When the outer packet reaches the other tunnel endpoint, the inner packet is obtained by decapsulating the encapsulation header. The intermediate switches thus consider the inner packet as the payload of the outer packet and remain unaware of the traffic flow of the inner packet. However, this prevents the intermediate switches from learning information about the flow. As a result, the intermediate switches may not be able to identify a flow in the tunnel that may require additional management (e.g., rouge traffic that should be dropped).

To solve this problem, embodiments of the present invention allows a switch initiating, forwarding, or terminating tunnel-encapsulated packets to inspect the header of an inner packet encapsulated with an encapsulated header. Such inspection can be referred to as an inner packet inspection or a deep packet inspection. This provides the switch visibility to the inner packets of a tunnel. During operation, the switch applies a rule (e.g., an access control list (ACL)) to incoming packets and selects the packets belonging to a tunnel. In some embodiments, the rule determines whether the packet belongs to a VXLAN tunnel (i.e., has a VXLAN header). Among the selected packets based on the rule, the switch samples a packet for visibility and performs the inner packet inspection on the sample packet. The switch then collects information associated with the inner packet and the flow, and stores that information in a tunnel information table.

In some embodiments, the switch provides the information of the tunnel information table to a management entity, which in turn, can provide a rule for managing that flow to the switch. For example, if the flow is causing congestion in one part of the network, the rule can instruct the switch to forward the flow to another part of the network. Examples of a management entity include, but are not limited to, a controller in a software-defined network (SDN) (e.g., an OpenFlow controller), a management application running on the central processor of the switch, and a management virtual machine running on a hypervisor hosted by the switch.

A rule can be based on, but is not limited to, a flow, a flow identifier assigned to a flow, a MAC address, an Internet Protocol (IP) address, an IP subnet, a customer VLAN tag, a service VLAN tag, and a global VLAN tag. A flow can be defined based on one or more of: a source MAC address, a destination MAC address, a source IP address, a destination IP address, an ingress port of the tunnel endpoint, and a transport protocol port (e.g., associated with a socket). In some embodiments, the rule can be flow definition, which includes a flow rule and a set of ports for which the flow rule is applicable. The flow definition can be obtained from a controller of an SDN. The flow rule can indicate how a packet can be forwarded in the SDN.

Upon receiving the rule, the switch can apply the rule to a respective line card and/or a respective port. However, a network may include a large number of flows. Since a flow can be forwarded via any available path in the network, a rule can be applied to a respective line card. As a result, the line card may include a large number of rules. Such rules for a line card can be stored in a local ternary content-addressable memory (TCAM), which is typically restricted in space and unsuitable for storing a large number of rules, many of which may not be applicable to the line card. For example, the flows corresponding to these rules may not be forwarded via the line card.

To solve this problem, upon receiving the rule for a flow, the switch generates an initial rule applicable to a virtual network identifier (e.g., a VNI) associated with the flow. The virtual network identifier identifies a virtualized network in the tunnel, and can be used to separate traffic of different clients or networks in the tunnel. Since traffic belonging to different devices (e.g., virtual machines or VMs) can carry the same virtual network identifier, defining rules based on the virtual network identifier can reduce the number of rules to be stored in the TCAM significantly.

If an incoming packet matches the initial rule (i.e., the packet includes the virtual network identifier in the tunnel header), the packet is selected for sampling. If a sample packet belongs to the flow (e.g., the source and destination MAC addresses of the inner packet match the rule), the switch determines a source address of the outer encapsulation header (e.g., a source IP address) and determines a previous hop for that source address from local routing information (e.g., routing information base or RIB). The switch further determines a line card that couples the previous hop from local forwarding information (e.g., forwarding information base or FIB) and applies the rule received from the management entity to that line card, thereby ensuring that a rule is applied to a line card if the line card processes a flow of that rule. In this way, the switch facilitates selective rule management to the switch.

In some embodiments, the switch can be a member switch of a network of interconnected switches (e.g., a fabric switch). In a fabric switch, any number of switches coupled in an arbitrary topology can be controlled as a single logical switch. The fabric switch can be an Ethernet fabric switch or a virtual cluster switch (VCS), which can operate as a single Ethernet switch. In some embodiments, a respective switch in the fabric switch is an Internet Protocol (IP) routing-capable switch (e.g., an IP router). In some further embodiments, a respective switch in the fabric switch is a Transparent Interconnection of Lots of Links (TRILL) routing bridge (RBridge).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary physical topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a cluster identifier), which is assigned to the fabric switch. Since a fabric switch can be represented as a logical chassis, the fabric identifier can also be referred to as a logical chassis identifier. A respective member switch of the fabric switch is associated with the fabric identifier. In some embodiments, a fabric switch identifier is pre-assigned to a member switch. As a result, when the switch joins a fabric switch, other member switches identifies the switch to be a member switch of the fabric switch.

In this disclosure, the term "fabric switch" refers to a number of interconnected physical switches which can form a single, scalable network of switches. The member switches of the fabric switch can operate as individual switches. The member switches of the fabric switch can also operate as a single logical switch in the provision and control plane, the data plane, or both. "Fabric switch" should not be interpreted as limiting embodiments of the present invention to a plurality of switches operating as a single, logical switch. In this disclosure, the terms "fabric switch" and "fabric" are used interchangeably.

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end host" can refer to any device external to a network (e.g., does not perform forwarding in that network). Examples of an end host include, but are not limited to, a physical or virtual machine, a conventional layer-2 switch, a layer-3 router, or any other type of network device. Additionally, an end host can be coupled to other switches or hosts further away from a layer-2 or layer-3 network. An end host can also be an aggregation point for a number of network devices to enter the network. An end host hosting one or more virtual machines can be referred to as a host machine. In this disclosure, the terms "end host" and "host machine" are used interchangeably.

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. A link between inter-switch ports is referred to as an "inter-switch link." The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, an RBridge identifier, or a combination thereof. In this disclosure, "switch identifier" is used as a generic term, is not limited to any bit format, and can refer to any format that can identify a switch.

The term "tunnel" refers to a data communication where one or more networking protocols are encapsulated using another networking protocol (typically, a lower-layer header is encapsulated in an upper-layer header). Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary utilization of traffic visibility in a tunnel, in accordance with an embodiment of the present invention. In this example, end devices 120 and 130 are host machines hosting a plurality of virtual machines. End device 120 hosts a VMM, which is a hypervisor 122 running a plurality of virtual machines 124, 126, and 128, and end device 130 hosts a hypervisor 132 running a plurality of virtual machines 134, 136, and 138. End device 120 and 130 are coupled to switches 102 and 104, respectively. Switches 102 and 104 are coupled to network 100 via switches 106, and 108, respectively. Network 100 can be a local area network (LAN), a wide area network (WAN), or a datacenter network (DCN). If network 100 is a DCN, switches 102 and 104 can be top of the rack switches.

One or more virtual machines of end devices 120 and 130 may belong to the same virtual LAN (VLAN). Suppose that virtual machines 124 and 134 belong to the same VLAN, and hence, consider themselves to be a part of a same local area network. As a result, virtual machines 124 and 134 may communicate via the layer-2 network (e.g., an Ethernet-base network). However, virtual machines 124 and 134 are separated by network 100, which can be a layer-3 network (e.g., an IP network). To facilitate communication between virtual machines 124 and 134, hypervisors 122 and 132 can establish a tunnel 110 between them. Tunnel 110 can be established based on a tunneling protocol. Examples of a tunneling protocol include, but are not limited to, VXLAN, GRE, NVGRE, L2TP, and MPLS.

During operation, hypervisor 122 receives a layer-2 packet 115 comprising a header 160, which includes a layer-2 header and an inner layer-3 header, from virtual machine 124. Hypervisor 122 determines from of header 160 that packet 115 is destined to virtual machine 134 and determines that virtual machine 134 is reachable via hypervisor 132 from a local tunnel-to-virtual machine mapping. Hypervisor 122 mapping can obtain this mapping from a virtualization manager. Hypervisor 122 encapsulates packet 115 in an encapsulation header 170 associated with tunnel 110 and generates an encapsulated packet 150. Hypervisor 122 then forwards packet 150 to switch 102. Hypervisor 132 receives packet 150 from switch 104 and determines that hypervisor 132 is the tunnel endpoint (i.e., encapsulation header 170 is destined to hypervisor 132). Hypervisor 132 then decapsulates encapsulation header 170 to obtain packet 115. Hypervisor 132 then provides packet 115 to virtual machine 134. In this way, tunnel 110 extends the layer-2 communication between virtual machines 124 and 134 across network 100.

In some embodiments, hypervisors 122 and 134 may not be able to establish a tunnel between them. For example, hypervisors 122 and 134 can be from different vendors, wherein hypervisor 122 can be a VMWare Hypervisor and hypervisor 134 can be a Microsoft Hyper-V. Switches 102 and 104 then can operate as tunnel gateways for hypervisors 122 and 134, and establish tunnel 110 between them. Switches 102 and 104 can obtain the tunnel-to-virtual machine mapping from the virtualization manager. Switches 102 and 104 operate as tunnel endpoints for tunnel 110 across network 100. In some embodiments, switch 102 or 104 is in a distributed tunnel endpoint, which includes a plurality of tunnel endpoints operating based on VRRP (not shown in FIG. 1A).

With existing technologies, when hypervisors 122 and 134 forward packet 150 via tunnel 110, the intermediate switches, which are switches 102, 104, 106, and 108, do not process packet 150 beyond header 170. The intermediate switches forward packet 150 based on header 170. The intermediate switches thus consider packet 115 as the payload of packet 150 and remain unaware of the traffic flow of packet 115 as indicated in header 160. However, this prevents the intermediate switches from learning information about the flow. As a result, the intermediate switches may not be able to identify a flow in tunnel 110 that may require additional management (e.g., rouge traffic that should be dropped).

To solve this problem, embodiments of the present invention allows an intermediate switch, such as switch 106, to inspect header 160 even when it is encapsulated with encapsulated header 170. This provides switch 106 visibility to the inner packets of tunnel 110. To enable inspection of header 160, switch 106 applies a rule (e.g., an access control list (ACL)) to incoming packets and selects the packets belonging to tunnel 110. This rule allows switch 106 to filter traffic from a tunnel of interest. As a result, if switch 106 is also forwarding other encapsulated packets, switch 106 may not inspect the inner header of those packets. The header inspection of an inner packet provides visibility of the traffic in tunnel 110 to switch 106.

Among the packets of tunnel 110 selected based on the rule, switch 106 samples a packet based on a predefined rate (e.g., one packet in every fifty packets). In some embodiments, switch 106 uses sampled flow (sFlow) to sample the packets. Suppose that switch 106 select packet 150 as a sample packet. Switch 106 then inspect header 160 to determine information associated with the flow of packet 15. In some embodiments, switch 106 determines a flow based on the source and destination MAC addresses of header 160, which belong to virtual machines 124 and 134, respectively. Collected information include, but are not limited to, data rate, used path, and traffic pattern. Switch 106 can store the collected information in a tunnel information table 190.

In some embodiments, switch 106 provides the information of tunnel information table 190 to a management entity. For example, the management entity can be a controller 112 in an SDN, which includes switches 102, 104, 106, and 108. Upon receiving the information of tunnel information table 190, controller 112 can provide a flow definition to switch 106 for managing the flow associated with packet 115. For example, if the flow is causing congestion in network 100, the flow definition can reroute the packets in the flow in network 100. The flow definition can include a flow rule and a set of ports for which the flow rule is applicable. If the flow definition does not specify the applicable ports, switch 106 applies the flow rule to a respective ingress port of switch 106. The flow rule can indicate how a packet can be forwarded in the SDN.

Examples of a management entity further include, but are not limited to, a data management application running on the control processor of a switch (e.g., the primary processor executing the operating system) and an application virtual machine running on a hypervisor hosted by a switch. For example, switch 108 can run a data management application 114. On the other hand, switch 102 can host a hypervisor 142, which can run a virtual router 144 and an application virtual machine 146. Virtual router 144 can perform the inner packet inspection for switch 102. Rules provided by data management application 114 or application virtual machine 146 can be defined based on ACL.

Upon receiving the rule (e.g., a flow definition, an ACL, etc.), switch 106 can apply the rule to a respective line card and/or a respective port. However, network 100 may include a large number of flows. Since a flow can be forwarded via any available path in network 100, each rule can be applied to each line card in switch 106. As a result, the line card may include a large number of rules. Switch 106 can store the rules for a line card in a TCAM associated with the line card. However, a TCAM usually have limited storage, and therefore, is unsuitable for storing a large number of rules. Furthermore, many of the flows in network 100 may not be forwarded via the line card. Storing these rules in the TCAM lead to inefficient usage of the TCAM.

To solve this problem, upon receiving the rule for a flow, switch 106 generates an initial rule applicable to a virtual network identifier associated with the flow. For example, if virtual machines 124, 126, 134, and 136 belong to the same VLAN, tunnel 110 can use a same virtual network identifier to distinguish the traffic of that VLAN. However, these virtual machines can have multiple flows, each with its own rule. To same room in the TCAM, switch 106 applies the initial rule to the TCAM instead of individual rule associated with a flow. If the same virtual network identifier is associated with multiple flows, switch 106 can generate one initial rule for each of the flows.

Suppose that packet 150 matches the initial rule (i.e., packet 150 includes the virtual network identifier in header 170). Switch 106 determines whether to select packet 150 as a sample packet. If packet 150 is selected as a sample packet, switch 106 inspects header 160 and determines the flow of packet 115. If the flow matches a rule received from the management entity, switch 106 determines a source address of header 170 (e.g., a source IP address of hypervisor 122). Switch 106 then checks the local routing information to determine that the previous hop for that source address is switch 102. Switch 106 checks the local forwarding information to determine that switch 102 is reachable from switch 106 via port 140. Switch 106 then applies the rule the line card comprising port 140. If each port of switch 106 can store its own ACL, switch 106 can apply the rule only to port 140.

Tunnel Information Management

FIG. 1B illustrates an exemplary traffic visibility in a tunnel-encapsulated packet, in accordance with an embodiment of the present invention. As described in conjunction with FIG. 1A, packet 115 is a packet send from virtual machine 124 to virtual machine 134. Packet 115 includes an inner layer-2 header 154 and a layer-2 payload 155. Header 154 includes a source MAC address 164 and a destination MAC address 165, which correspond to virtual machines 124 and 134, respectively. Layer-2 payload 155 can be a layer-3 packet with an inner layer-3 header 156 and a layer-3 payload 157. Header 156 includes a source IP address 166 and a destination IP address 167, which also correspond to virtual machines 124 and 134, respectively. Layer-2 header 154 and layer-3 header 156 together can be referred to as inner header 160.

In tunnel 110, packet 115 is encapsulated with a tunnel encapsulation header 170 to generate tunnel encapsulated packet 150, as described in conjunction with FIG. 1A. Tunnel encapsulation header 170 includes an outer layer-2 header 151, an outer layer-3 header 152, and a tunnel header 153. Packet 115 can be the payload for packet 150. Outer layer-2 header 151 is used for hop-by-hop forwarding in tunnel 110 and is changed at each hop. Header 152 includes a source IP address 161 and a destination IP address 162, which correspond to hypervisors 122 and 132, respectively. Tunnel header 153 includes a virtual network identifier 163. For example, if header 153 is a VXLAN header, virtual network identifier 163 can be a VXLAN network identifier (VNI).

With inner packet inspection, a switch in tunnel 110 can examine inner header 160 without decapsulating encapsulation header 170. For example, the switch can determine a layer-2 flow based on source MAC address 164 and destination MAC address 165. Similarly, the switch can determine a layer-3 flow based on source IP address 161 and destination IP address 162. The switch can collect information regarding the flow (e.g., data statistics) and generate a tunnel information table. The switch then provides that information to a management entity.

FIG. 1C illustrates an exemplary tunnel information table facilitating utilization of traffic visibility in a tunnel, in accordance with an embodiment of the present invention. Tunnel information table 190 maps a flow to a tunnel, a virtual network identifier, and traffic information associated with the flow. Suppose that MAC addresses 180, 182, and 184 are associated with one VLAN and MAC addresses 186 and 188 are associated with another VLAN. As a result, in tunnel 110, MAC addresses 180, 182, and 184 are allocated a virtual network identifier 192, and MAC addresses 186 and 188 are allocated a virtual network identifier 194.

Suppose that a switch in tunnel 110 identifies a flow between MAC addresses 180 and 182, and generates a corresponding entry in tunnel information table 190. The entry maps the flow to tunnel 110, which can be identified by the IP addresses of hypervisors of 122 and 132, virtual network identifier 192, and associated traffic information 172. Table 190 also maps a flow between MAC addresses 182 and 184 to tunnel 110, virtual network identifier 192, and associated traffic information 174. Table 190 further maps a flow between MAC addresses 186 and 188 to tunnel 110, virtual network identifier 194, and associated traffic information 176.

Network of Interconnected Switches

Figure 2:
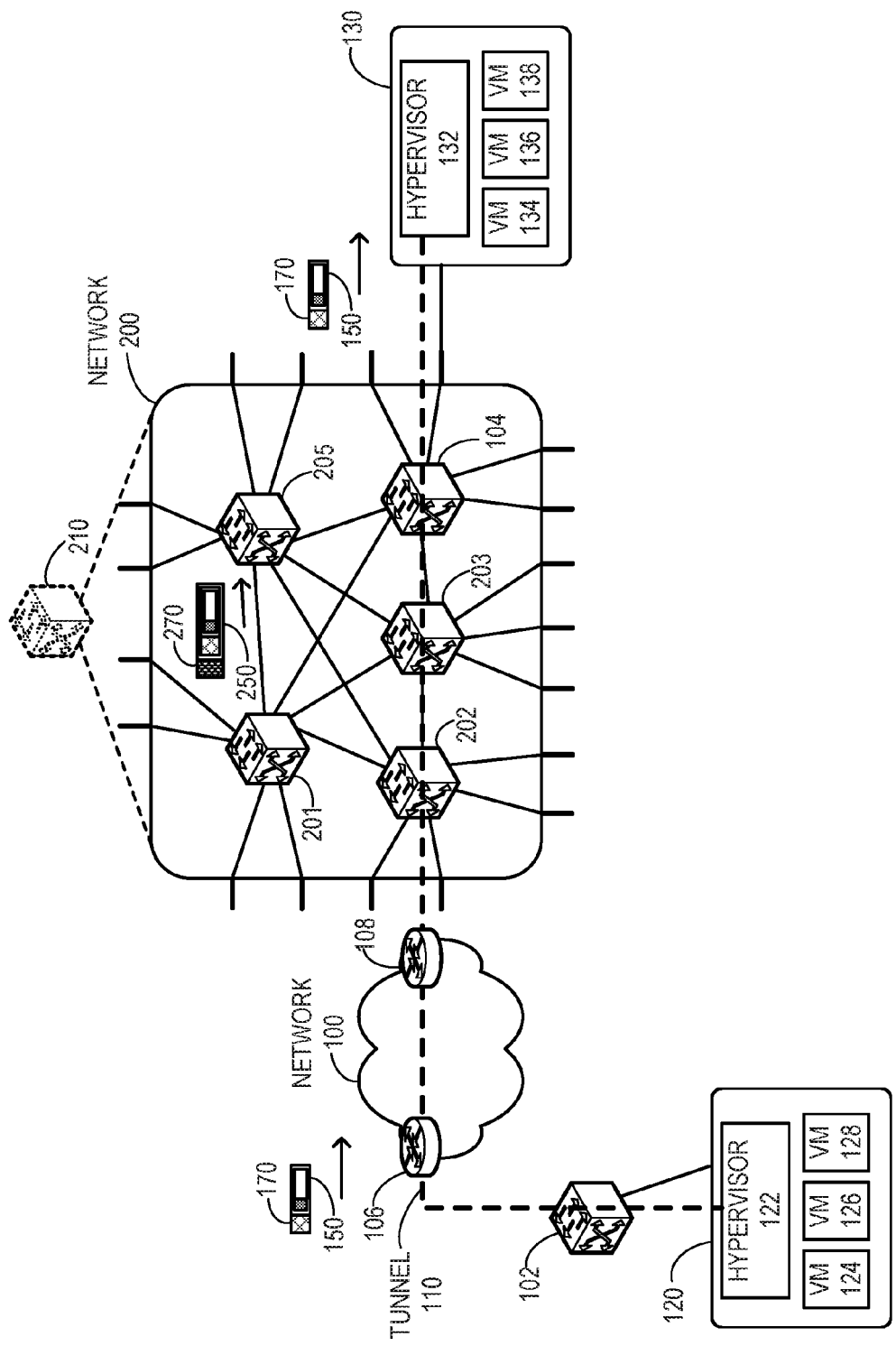
FIG. 2 illustrates an exemplary network of interconnected switched operating as a tunnel endpoint supporting utilization of traffic visibility in a tunnel, in accordance with an embodiment of the present invention.

FIG. 2 illustrates an exemplary network of interconnected switched operating as a tunnel endpoint supporting utilization of traffic visibility in a tunnel, in accordance with an embodiment of the present invention. As illustrated in FIG. 2, switch 104 is a switch a network 200, which also includes switches 201, 202, 203, and 205. Here, end device 130 is coupled to switch 104. In this example, network 100 is coupled to switch 202. In some embodiments, network 200 is represented as a virtual switch 210 with a virtual MAC address and a virtual IP address. Network 200 can use virtual switch 210 to forward packets in tunnel 110 using the virtual IP and/or MAC addresses. For example, switch 108 forwards packet 150 to network 200 (i.e., to switch 202) using the virtual MAC and IP addresses of virtual switch 210.

In some embodiments, network 200 is TRILL network and a respective switch in network 200 is a TRILL RBridge. Inter-switch packet forwarding in network 200 can be based on encapsulating an Ethernet packet received from an end device with a TRILL header. In some further embodiments, network 200 is an IP network and a respective switch of network 200, such as switch 104, is an IP-capable switch, which calculates and maintains a local IP routing table (e.g., a routing information base or RIB), and is capable of forwarding packets based on its IP addresses. Under such a scenario, communication among the switches in network 200 is based on IP or IP-based tunneling. Examples of such a tunneling protocol include, but are not limited to, VXLAN, GRE, L2TP, and MPLS.

In some embodiments, network 200 is a fabric switch (under such a scenario, network 200 can also be referred to as fabric switch 200). Fabric switch 200 is identified by and assigned to a fabric switch identifier (e.g., a fabric label). A respective member switch of fabric switch 200 is associated with that fabric switch identifier. This allows the member switch to indicate that it is a member of fabric switch 200. In some embodiments, whenever a new member switch joins fabric switch 200, the fabric switch identifier is associated with that new member switch. Furthermore, a respective member switch of fabric switch 200 is assigned a switch identifier (e.g., an RBridge identifier, a Fibre Channel (FC) domain ID (identifier), or an IP address). This switch identifier identifies the member switch in fabric switch 200. The fabric label can be included in a header of packet for any inter-fabric and/or intra-fabric communication.

Switches in network 200 use edge ports to communicate with end devices (e.g., non-member switches) and inter-switch ports to communicate with other member switches. For example, switch 104 is coupled to end device 130 via an edge port and to switches 201, 202, 203, and 205 via inter-switch ports and one or more links. Data communication via an edge port can be based on Ethernet and via an inter-switch port can be based on a fabric encapsulation protocol (e.g., VXLAN or TRILL). It should be noted that control message exchange via inter-switch ports can be based on a different protocol (e.g., the IP or FC protocol).

Suppose that switch 202 receives a packet 150 from switch 108. Switch 202 determines that packet 150 should be forwarded via tunnel 100 to hypervisor 130. Switch 202 determines that hypervisor 130 is reachable via switch 104 (e.g., from routing and forwarding information maintained by a respective switch of network 200). Switch 202 then encapsulates packet 150 with a fabric encapsulation header 270 to generate an encapsulated packet 250. Fabric encapsulation header 270 can include switch identifies of switches 202 and 104 as source and destination addresses, respectively. Here, packet 250 includes encapsulations header 170, which is associated with tunnel 110, further encapsulated with encapsulation header 270, which is used for forwarding in network 200.

Based on encapsulation header 270, switch 202 forwards packet 250 to switch 104 via network 200. For example, if network 200 is a TRILL network, switch 104 can forward packet 250 based on TRILL forwarding. On the other hand, if network 200 is an IP network, switch 104 can forward packet 250 based on IP-based tunnel forwarding. Upon receiving packet 250, switch 104 determines that the local switch identifier is the destination address of encapsulation header 270. Switch 104 then decapsulates encapsulation header 270 and obtains packet 150. Switch 104 determines that the destination address of encapsulation header 170 correspond to hypervisor 130, and identifies the port associated with the address of hypervisor 130. Switch 104 then forwards packet 150 via the port.

Inner Packet Inspection

Figure 3A:
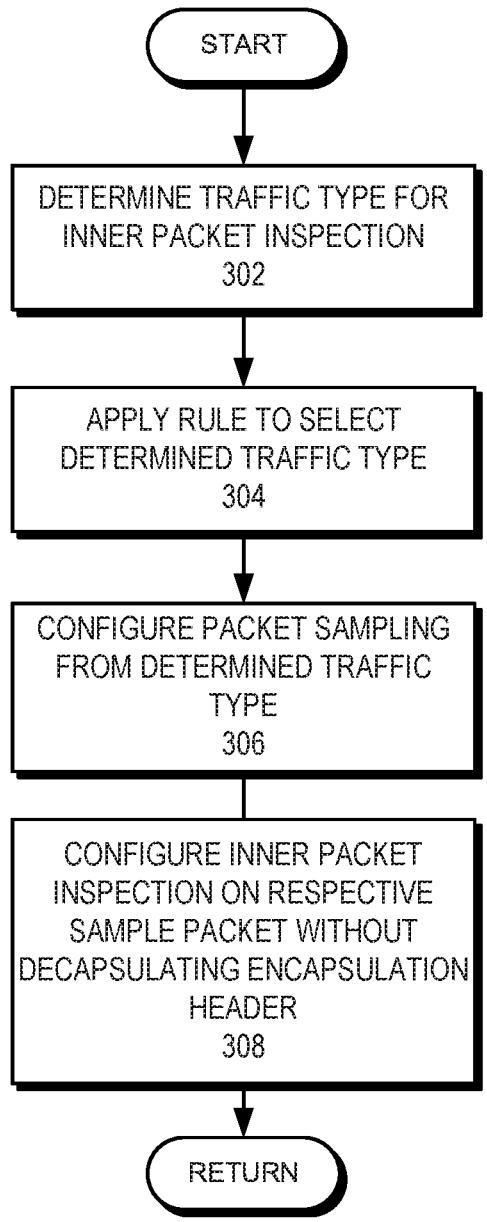
FIG. 3A presents a flowchart illustrating an exemplary process of a switch initializing traffic visibility in a tunnel, in accordance with an embodiment of the present invention.

FIG. 3A presents a flowchart illustrating an exemplary process of a switch initializing traffic visibility in a tunnel, in accordance with an embodiment of the present invention. During operation, the switch determines traffic type for inner packet inspection (operation 302) and applies a rule to select the determined traffic type (operation 304). For example, if the traffic type is VXLAN, the rule can be an ACL that selects VXLAN traffic received by the switch. The switch then configures packet sampling samples from the determined traffic type (operation 306) (e.g., one packet in every n packets using sFlow). The switch also configures inner packet inspection on a respective sample packet without decapsulating the encapsulation header (operation 308).

Figure 3B:
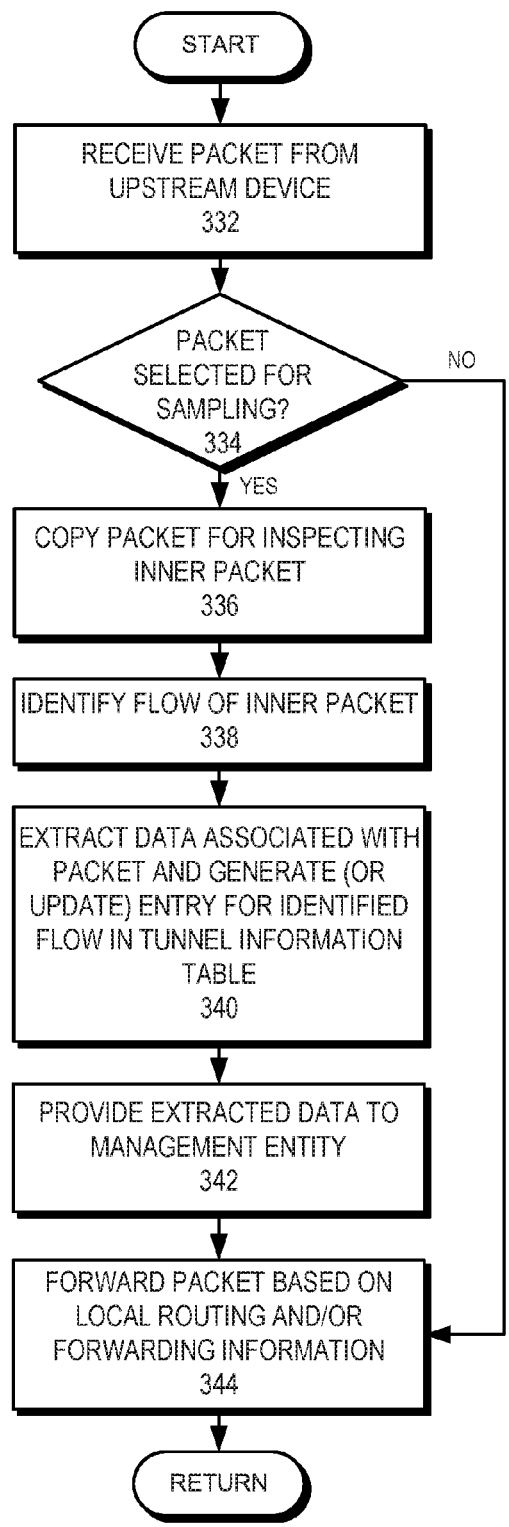
FIG. 3B presents a flowchart illustrating an exemplary process of a switch performing inner packet inspection for facilitating traffic visibility in a tunnel, in accordance with an embodiment of the present invention.

FIG. 3B presents a flowchart illustrating an exemplary process of a switch performing inner packet inspection for facilitating traffic visibility in a tunnel, in accordance with an embodiment of the present invention. During operation, the switch receives a packet from an upstream switch (operation 332) and determines whether the packet is selected for sampling (operation 334). If the packet is selected for sampling, the switch copies the packet for inspecting the inner packet (operation 336) and identifies the flow (the layer-2 and/or layer-3 flow) of the inner packet (operation 338).

The switch extracts the data associated with the packet and generates (or update) an entry for the identified flow in a local tunnel information table (operation 340). For example, if an entry already exists for the flow, the switch updates the entry with the data associated with the packet, as described in conjunction with FIG. 1C. The switch provides extracted data to a management entity (operation 342) (e.g., to a controller, an application virtual machine, or a data management application). If the packet is not selected for sampling (operation 334) or the data is provided to the management entity (operation 342), the switch forwards the packet based on the local routing and/or forwarding information (operation 344).

Figure 3C:
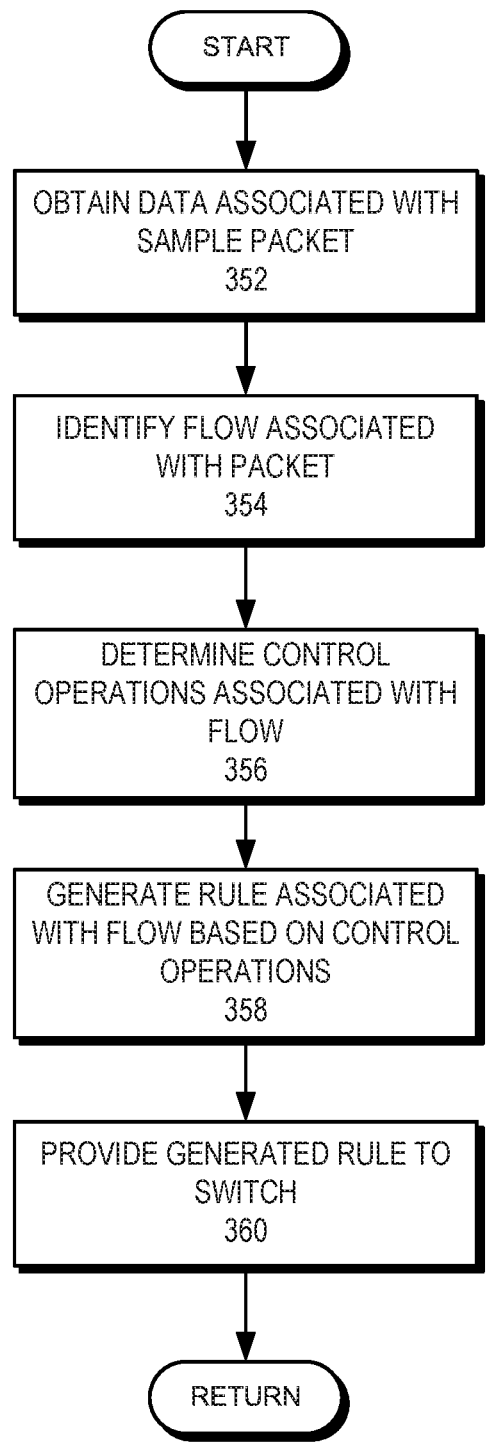
FIG. 3C presents a flowchart illustrating an exemplary process of a management entity providing a rule to a switch based on traffic visibility in a tunnel, in accordance with an embodiment of the present invention.

FIG. 3C presents a flowchart illustrating an exemplary process of a management entity providing a rule to a switch based on traffic visibility in a tunnel, in accordance with an embodiment of the present invention. The management entity obtains data associated with a sample packet (operation 352) and identifies a flow associated with the packet (operation 354). The management entity determines control operations associated with the flow (operation 356). Such control operation can indicate how the flow should be processed in the switch. The management entity then generates a rule associated with the flow based on the control operations (operation 358) and provides the generated rule to the switch (operation 360).

Selective Rule Management

Figure 4A:
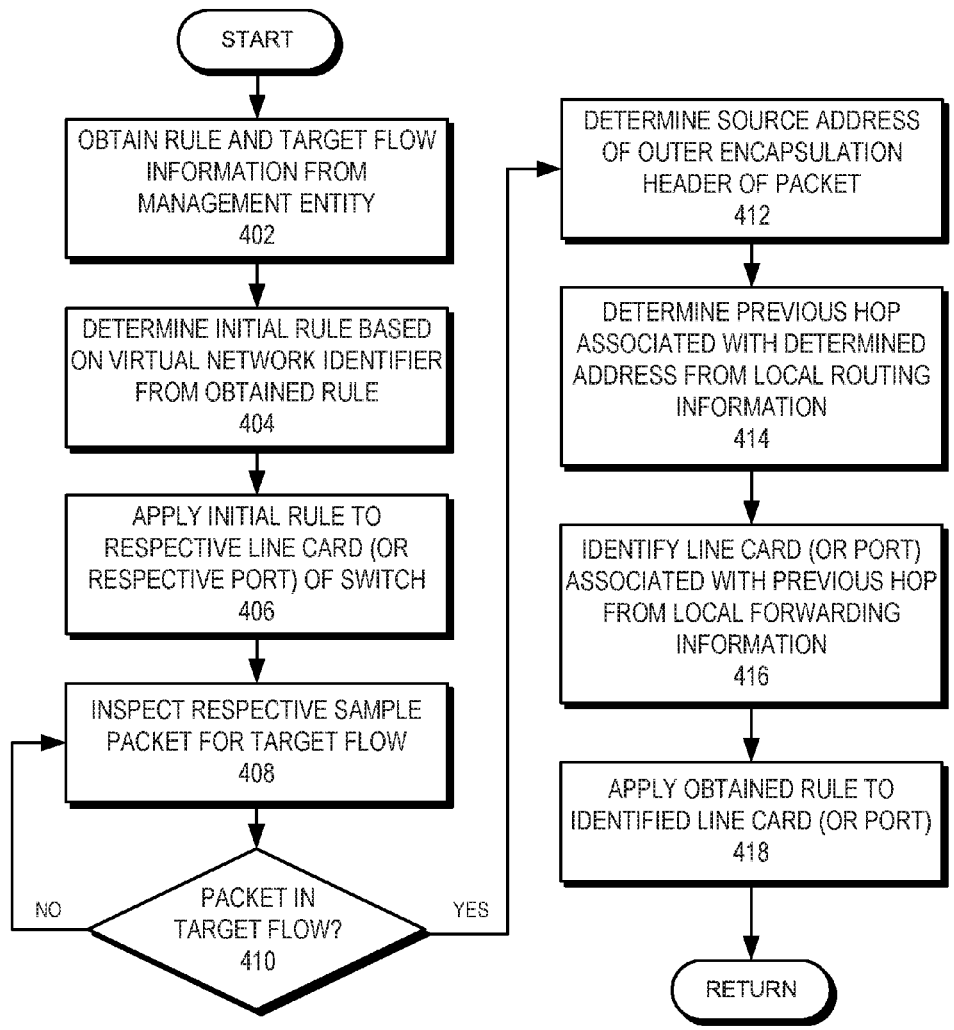
FIG. 4A presents a flowchart illustrating an exemplary process of a switch selectively deploying a rule based on traffic visibility in a tunnel, in accordance with an embodiment of the present invention.

FIG. 4A presents a flowchart illustrating an exemplary process of a switch selectively deploying a rule based on traffic visibility in a tunnel, in accordance with an embodiment of the present invention. The switch obtains a rule and the corresponding target flow information from a management entity (operation 402). The switch determines an initial rule based on a virtual network identifier from the obtained rule (operation 404) and applies the initial rule to a respective line card (or a respective port) of the switch (operation 406). The switch inspects a respective sample packet for the target flow (operation 408) and checks whether the packet is in the target flow (operation 410).

If the packet is not in the target flow, the packet continues to inspect a respective sample packet for the target flow (operation 408). On the other hand, if the packet is in the target flow, the switch determines the source address of the outer encapsulation header of the packet (operation 412). The switch determines a previous hop associated with the determined address from the local routing information (operation 414). The switch also determines a line card (or port) associated with the previous hop from the local forwarding information (operation 416). The switch then applies the obtained rule to the identified line card (or port) (operation 418).

Figure 4B:
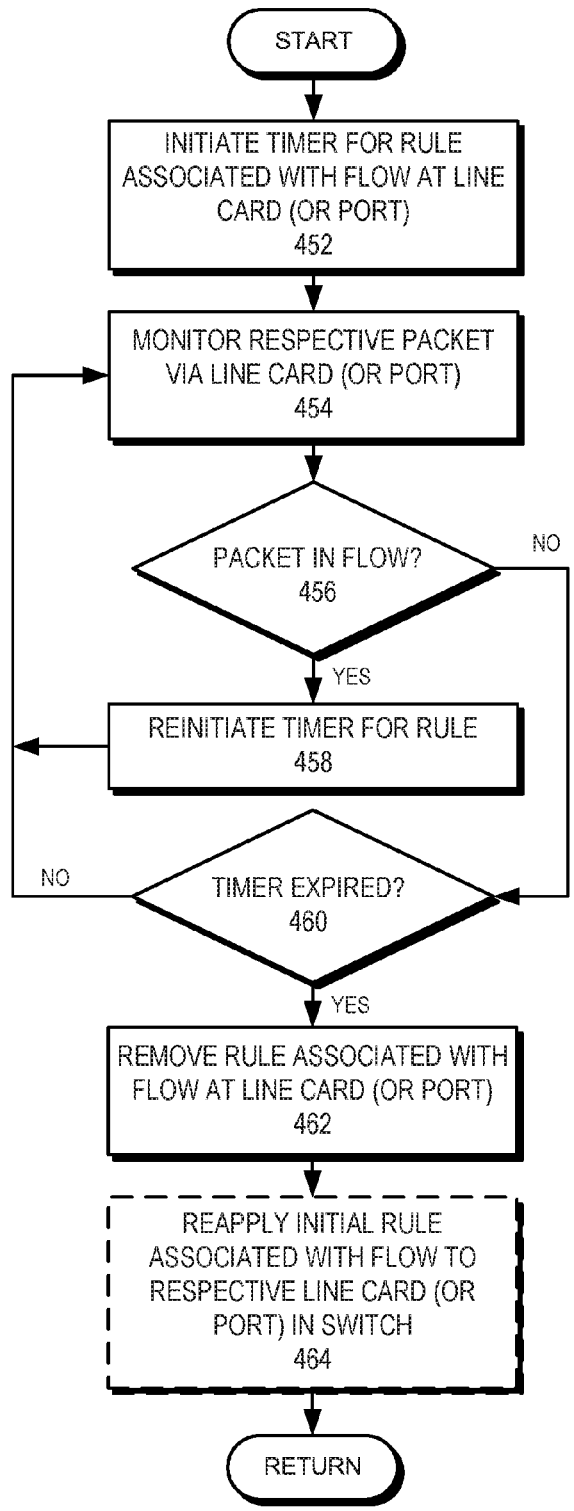
FIG. 4B presents a flowchart illustrating an exemplary process of a switch determining validity of a rule, in accordance with an embodiment of the present invention.

FIG. 4B presents a flowchart illustrating an exemplary process of a switch determining validity of a rule, in accordance with an embodiment of the present invention. During operation, the switch initiates a timer for the rule associated with a flow at a line card (or port) (operation 452) and monitors a respective packet via the line card (or port) (operation 454). The switch checks whether the packet is in the flow (operation 456). If the packet is in the flow, the switch reinitiates the timer for the rule (operation 458) and continues to monitor a respective packet via the line card (or port) (operation 454).

On the other hand, if the packet is not in the flow, the switch checks whether the timer associated with the rule has been expired (operation 460). If the timer has not expired, the rule remains in effect. The switch then continues to monitor a respective packet via the line card (or port) (operation 454). If the timer has expired, the switch removes the rule associated with the flow at the line card (or port) (operation 462). In this way, a rule can be removed from the line card, thereby freeing up room the TCAM. The switch can, optionally, reapplies the initial rule associated with the flow to a respective line card (or port) of the switch (operation 464).

Exemplary Switch

Figure 5:
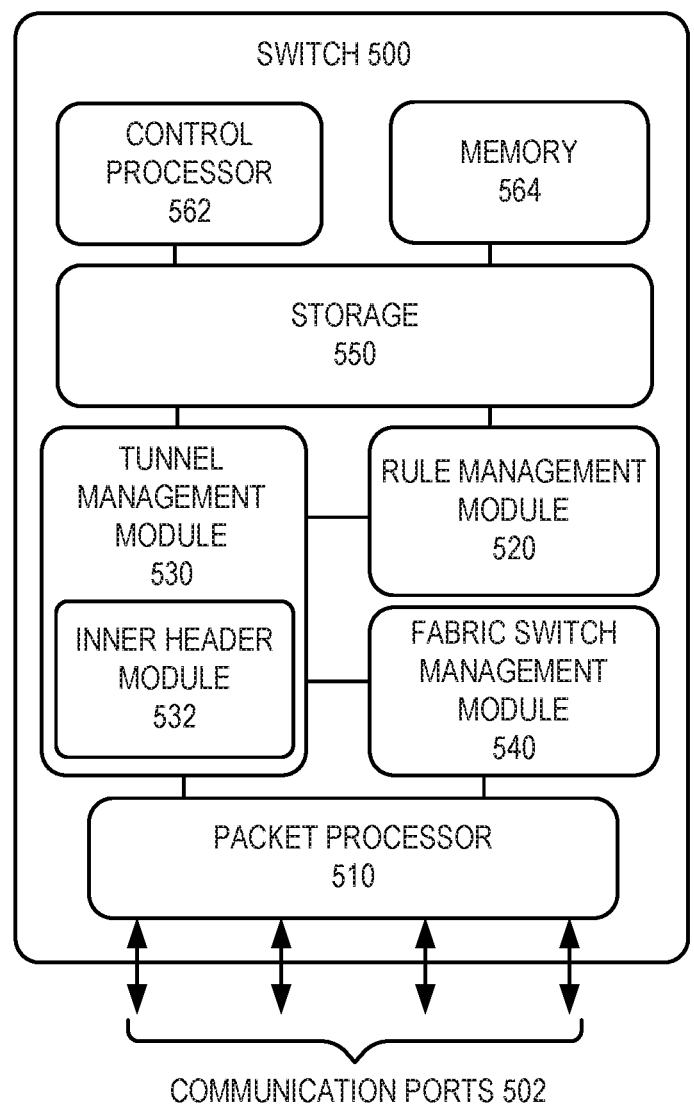
FIG. 5 illustrates an exemplary switch facilitating utilization of traffic visibility in a tunnel, in accordance with an embodiment of the present invention.

FIG. 5 illustrates an exemplary switch facilitating utilization of traffic visibility in a tunnel, in accordance with an embodiment of the present invention. In this example, a switch 500 includes a number of communication ports 502, a packet processor 510, a tunnel management module 530, a inner header module 532, a rule management module 520, and a storage device 550. Switch 500 can also include switch modules, such as processing hardware of switch 500 (e.g., ASIC chips).

Packet processor 510 extracts and processes header information from the received packets. Packet processor 510 can identify a switch identifier associated with the switch in the header of a packet. Switch 500 can also include a control processor 562 and a memory 564, which allow switch 500 to operate as a management entity. Packet processor 510 can also construct a control message for a controller comprising information from the tunnel information table. Packet processor 510 can receive one or more flow definitions from the controller and apply them to corresponding ports. If the flow definition includes a generic flow rule, control processor 562 can convert the generic flow rule to a respective port specific flow rule for a respective SDN-enabled port in communication ports 502.

In some embodiments, switch 500 maintains a membership in a fabric switch, as described in conjunction with FIG. 1, wherein switch 500 also includes a fabric switch module 540. Fabric switch module 540 maintains a configuration database in storage device 550 that maintains the configuration state of every switch within the fabric switch. Fabric switch module 540 maintains the state of the fabric switch, which is used to join other switches. In some embodiments, switch 500 can be configured to operate in conjunction with a remote switch as an Ethernet switch.

In some embodiments, switch 500 includes a tunnel management module 530, which operates switch 500 as a tunnel endpoint and maintains a corresponding tunnel. Tunnel management module 530 can operate switch 500 as a distributed tunnel endpoint in conjunction with another switch for a plurality of service tunnels. Switch 500 and the other switch are associated with an IP address indicating the distributed tunnel endpoint. Packet processor 510 encapsulates the packet with an encapsulation header and sets the IP address as a source address of the encapsulation header. Tunnel management module 530 can elect a distribution master from switch 500 and the other switch.

Communication ports 502 can include inter-switch communication channels for communication within the fabric switch. This inter-switch communication channel can be implemented via a regular communication port and based on any open or proprietary format. Communication ports 502 can also include one or more extension communication ports for communication between neighbor fabric switches. Communication ports 502 can include one or more TRILL ports capable of receiving frames encapsulated in a TRILL header. Communication ports 502 can also include one or more IP ports capable of receiving IP packets. An IP port is capable of receiving an IP packet and can be configured with an IP address. Packet processor 510 can process TRILL-encapsulated frames and/or IP packets (e.g., tunnel encapsulated packets).

During operation, rule management module 520 obtains a rule associated with a data flow within tunnel encapsulation of a tunnel. This rule indicates how the flow is to be processed at the switch. Rule management module 520 then applies an initial rule to a respective line card of the switch. Inner packet module 532 determines that a first inner packet, which is encapsulated with a first encapsulation header, belongs to the flow without decapsulating the first encapsulation header. In response, rule management module 520 applies the obtained rule to a line card associated with an ingress port of the encapsulated first inner packet.

In some embodiments, rule management module 520 determines a previous hop for the encapsulated first inner packet from a local routing table and identifies a port associated with the previous hop as the ingress port from a local forwarding table. Rule management module 520 can also select the first inner packet in response to matching the virtual network identifier. Rule management module 520 can select the second inner packet for inspecting the inner header by sampling packets of the flow. Rule management module 520 can also incorporate information associated with the second inner packet in a tunnel information table.

Note that the above-mentioned modules can be implemented in hardware as well as in software. In one embodiment, these modules can be embodied in computer-executable instructions stored in a memory which is coupled to one or more processors in switch 500. When executed, these instructions cause the processor(s) to perform the aforementioned functions.

In summary, embodiments of the present invention provide a switch and a method that facilitate selective rule management based on inner packet inspection. In one embodiment, the switch includes a storage device, a rule management module, an inner packet module, and a packet processor. During operation, the rule management module obtains a rule associated with a data flow within tunnel encapsulation of a tunnel. This rule indicates how the flow is to be processed at the switch. The rule management module then applies an initial rule to a respective line card of the switch. The initial rule is derived from a virtual network identifier, which is associated with the tunnel, of the obtained rule. The inner packet module determines that a first inner packet, which is encapsulated with a first encapsulation header, belongs to the flow without decapsulating the first encapsulation header. In response, the rule management module applies the obtained rule to a line card associated with an ingress port of the encapsulated first inner packet.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   rule management circuitry configured to:
   obtain a rule associated with a data flow within tunnel encapsulation of a tunnel, wherein the rule indicates how the flow is to be processed at the switch; and
   apply an initial rule to a respective line card of the switch, wherein the initial rule is derived from a virtual network identifier of the obtained rule, and the virtual network identifier associated with the tunnel; and
   inner packet circuitry configured to determine that a first inner packet, which is encapsulated with a first encapsulation header, belongs to the flow without decapsulating the first encapsulation header; and
   wherein the rule management circuitry is further configured to apply the obtained rule to a line card associated with an ingress port of the encapsulated first inner packet.

2. The switch of claim 1, wherein the rule management circuitry is further configured to:
   determine a previous hop for the encapsulated first inner packet from a local routing table; and
   identify a port associated with the previous hop as the ingress port from a local forwarding table.

3. The switch of claim 1, wherein the rule management circuitry is further configured to select the first inner packet in response to matching the virtual network identifier.

4. The switch of claim 1, wherein the tunnel is a virtual extensible local area network (VXLAN) tunnel and the virtual network identifier is a VXLAN network identifier (VNI).

5. The switch of claim 1, wherein the switch is a member of a network of interconnected switches, which is identified based on a fabric identifier, wherein the network of interconnected switches operates as a tunnel endpoint for the tunnel.

6. The switch of claim 1, wherein obtaining the rule includes:
   inspecting an inner header of a second inner packet encapsulated with a second encapsulation header without decapsulating the second encapsulation header, wherein the encapsulation header is associated with the tunnel, and wherein the second inner packet belongs to the flow; and
   providing information associated with the inner header to a management entity capable of generating the rule.

7. The switch of claim 6, wherein the rule management circuitry is further configured to select the second inner packet for inspecting the inner header by sampling packets of the flow.

8. The switch of claim 6, wherein the rule management circuitry is further configured to incorporate information associated with the second inner packet in a tunnel information table.

9. The switch of claim 6, wherein the management entity is one of: a management application, an application virtual machine, and a controller of a software defined network (SDN).

10. The switch of claim 1, wherein the rule is one of:
    an access control list (ACL) applicable to a port of the switch; and
    a flow definition specifying how a flow is to be processed in the SDN, wherein the flow definition is provided by a controller of the SDN.

11. A method, comprising:
    obtaining, by a switch, a rule associated with a data flow within tunnel encapsulation of a tunnel, wherein the rule indicates how the flow is to be processed at the switch;

applying an initial rule to a respective line card of the switch, wherein the initial rule is derived from a virtual network identifier of the obtained rule, and the virtual network identifier associated with the tunnel;

determining that a first inner packet, which is encapsulated with a first encapsulation header, belongs to the flow without decapsulating the first encapsulation header; and applying the obtained rule to a line card associated with an ingress port of the encapsulated first inner packet.

12. The method of claim 11, further comprising:
determining a previous hop for the encapsulated first inner packet from a local routing table; and
identifying a port associated with the previous hop as the ingress port from a local forwarding table.

13. The method of claim 11, further comprising selecting the first inner packet in response to matching the virtual network identifier.

14. The method of claim 11, wherein the tunnel is a virtual extensible local area network (VXLAN) tunnel and the virtual network identifier is a VXLAN network identifier (VNI).

15. The method of claim 11, wherein the switch is a member of a network of interconnected switches, which is identified based on a fabric identifier, wherein the network of interconnected switches operates as a tunnel endpoint for the tunnel.

16. The method of claim 11, wherein obtaining the rule includes:
inspecting an inner header of a second inner packet encapsulated with a second encapsulation header without decapsulating the second encapsulation header, wherein the encapsulation header is associated with the tunnel, and wherein the second inner packet belongs to the flow; and
providing information associated with the inner header to a management entity capable of generating the rule.

17. The method of claim 16, further comprising selecting the second inner packet for inspecting the inner header by sampling packets of the flow.

18. The method of claim 16, further comprising incorporating information associated with the second inner packet in a tunnel information table.

19. The method of claim 16, wherein the management entity is one of: a management application, an application virtual machine, and a controller of a software defined network (SDN).

20. The method of claim 11, wherein the rule is one of:
an access control list (ACL) applicable to a port of the switch; and
a flow definition specifying how a flow is to be processed in the SDN, wherein the flow definition is provided by a controller of the SDN.

* * * * *